May 23, 1944. E. E. OBERST 2,349,515

ASTRONOMICAL EDUCATIONAL DEVICE

Filed Aug. 14, 1942 2 Sheets-Sheet 1

Inventor
Edward E. Oberst
By Rockwell Bartholow
Attorneys

May 23, 1944. E. E. OBERST 2,349,515
ASTRONOMICAL EDUCATIONAL DEVICE
Filed Aug. 14, 1942 2 Sheets-Sheet 2

Inventor
Edward E. Oberst
By Rockwell Bartholow
Attorneys

Patented May 23, 1944

2,349,515

UNITED STATES PATENT OFFICE 2,349,515

ASTRONOMICAL EDUCATIONAL DEVICE

Edward E. Oberst, New Haven, Conn.

Application August 14, 1942, Serial No. 454,822

13 Claims. (Cl. 35—47)

This invention relates to an appliance for illustrating the celestial sphere, and more particularly to such an appliance which is adapted for use in the study of astronomy or the heavenly bodies. It will be understood, however, that it is not limited to such use, but may also be employed for navigational purposes, that is, by navigators when taking observations of the stars or when it is required to ascertain a position on the surface of the earth.

It is well known that the average student of astronomy has difficulty in visualizing the heavens as they should appear at any particular time, and also has difficulty in "reading" a star map or a map of the heavens, as it is very difficult for him to identify the stars upon the map with those appearing in the heavens, particularly in view of the fact that distortions must inevitably occur when it is attempted to reproduce the celestial sphere on a flat surface.

One object of the present invention is to provide an educational appliance to be used in the study of astronomy or the like, upon which may be shown an accurate representation of the celestial sphere.

A still further object of the invention is to provide an appliance of the character described which will be capable of various adjustments, so that it may be set for any particular latitude, i. e., the latitude of the observer, and also may be adjusted for any time of the day and year.

A still further object of the invention is to provide an appliance of the character described which will not only accurately reproduce the celestial sphere, but also present for observation substantially one half of this sphere, so that it will accurately represent the heavens as seen by an observer at any predetermined latitude, with the proper determination of the horizon so that the stars or other heavenly bodies will be in their proper locations with respect to the horizon.

Other objects and advantages of the invention will appear as the description proceeds.

To these and other ends the invention consists in the novel features and combinations of parts to be hereinafter described and claimed.

Figure 5:
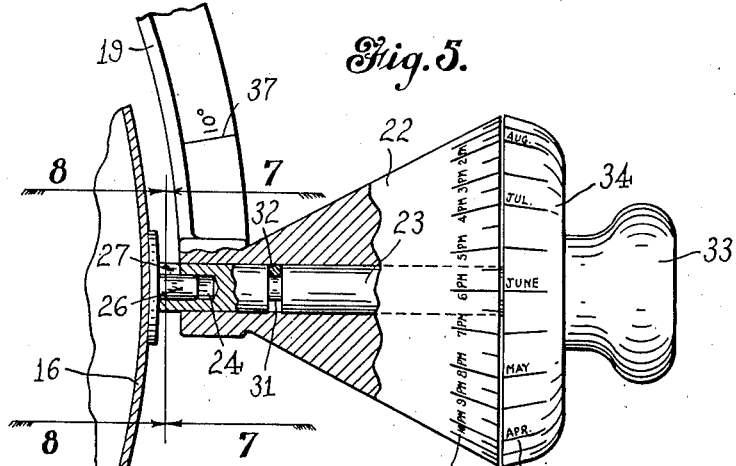
Fig. 5 is a detail view, partly in section, of the adjusting devices for rotating the sphere upon its polar axis.
Figure 6:
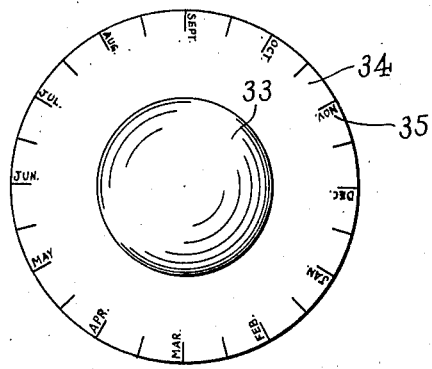
Fig. 6 is a front view of the adjusting device shown in Fig. 5.
Figure 7:
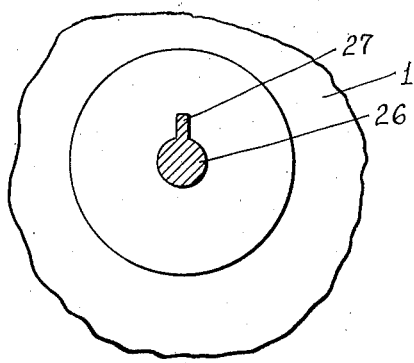
Figure 8:
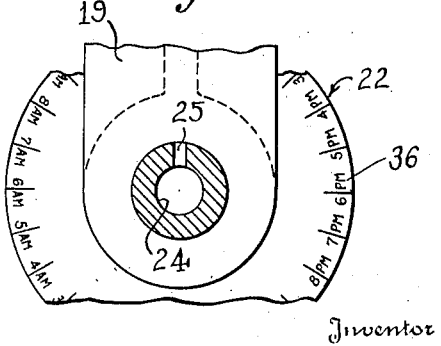

Figs. 7 and 8 are detail sectional views on lines 7—7 and 8—8 of Fig. 5, respectively.

Figure 1:
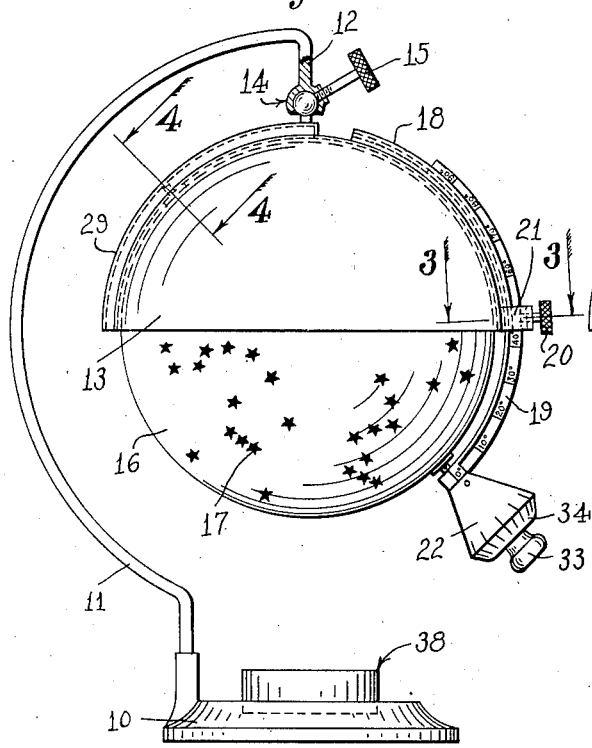
Fig. 1 is a side elevational view of an astronomical educational device embodying my invention.
Figure 2:
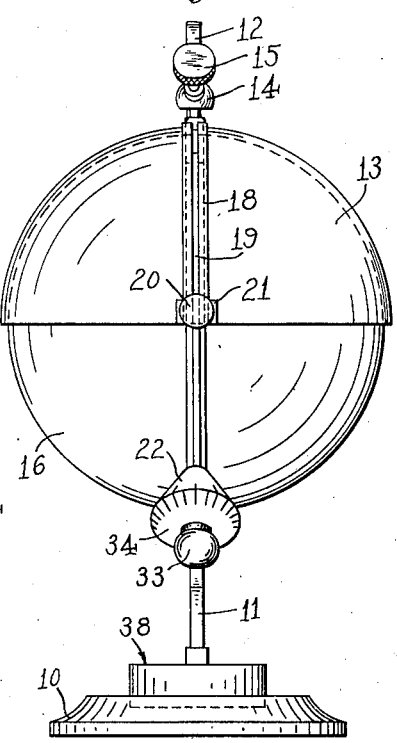
Fig. 2 is a front elevational view of the same.

To illustrate a preferred embodiment of my invention I have shown in Fig. 1 of the drawings a support comprising a base 10 to which is secured a generally upstanding curved supporting arm 11 having adjacent its upper end a depending portion 12 to which is secured a hollow hemispherical hood or shade 13 by means of a ball and socket joint 14, so that the shade will have substantially universal movement about the part 12. As shown, the ball is secured to the shade and the socket secured to the member 12, although this arrangement may be reversed if desired, and a set screw 15 is threaded into the socket so that its inner end may impinge against the ball and thus hold the shade 13 in any desired adjusted position.

For a purpose to be hereinafter described, the shade 13 will usually be of a dark color. It may be opaque, so that no light whatever will pass therethrough. It may, however, be translucent, but in any event it will be sufficiently dark so that the light which passes through it will be greatly restricted, for, as will later appear, this hood or shade will lie behind that part of the celestial sphere to be seen by the observer. If desired, the hood may have a lining of soft cloth or the like so as to provide for the easy movement of the celestial sphere therein, as will later appear.

A spherical body or globe 16 representing the celestial sphere is mounted so that approximately one half of its surface is embraced within the hood 13, the diameter of the sphere 16 and hemisphere 13 being substantially equal, but so proportioned that the hood will fit snugly over the upper half of the sphere. The sphere 16 will be a representation of the celestial sphere, and will carry indicia 17 representing the stars or other heavenly bodies. This sphere will preferably be made of a transparent material, such as glass or plastic, and the indicia may be applied thereto in any manner. These members 17, however, will preferably have their opposite sides of contrasting colors, the inner surfaces thereof being white, or at least of a very light color, while the outer surfaces thereof will be either black, if the hood 13 is opaque, or of the same dark color as the hood 13 if the latter is translucent.

With this arrangement it will be apparent that if one looks through the sphere 16 toward the inner surface of the hood 13, he will not see the indicia 17 which lie upon the exposed portion of the sphere, as these members will not contrast with the hood 13, and will, therefore, not be apparent. The observer will, however, see the stars or indicia 17 which lie within the hood 13, as the inner surfaces of these elements will lie toward the observer and will contrast with the color of the hood. Therefore, the observer looking into the lower part of the sphere 16 toward the hood 13 will be aware visually only of those stars or heavenly bodies which lie within the hood 13, and will thus see such stars in the same relation and location as if he were viewing the heavens from the surface of the earth, with the lower edge of the hood 13 simulating the horizon, and the portion of the hood immediately below the ball and socket joint 14 simulating the zenith.

Figure 3:
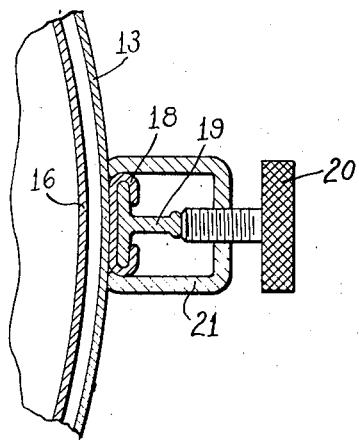
Fig. 3 is a detail sectional view on line 3—3 of Fig. 1.

As the stars which may be seen by an observer differ depending upon the latitude of the position of the latter, and also upon the time of day and the time of the year, it is desirable to be able to so adjust the sphere 16 within the hood 13 that it may be set for any desired period of the day or year, or any desired latitude. To this end, the shade 13 is provided upon one side with a channel-shaped guide or track 18, shown in cross section in Fig. 3, which guide may be secured to the member 13 in any desired way. Within this track is slidably received the base of an arcuate member 19 of inverted T-shaped form in cross section, as shown in Fig. 3, so that the member 19 may be slidably adjusted in the guide 18. A set screw 20, threaded into a supporting member 21 which embraces the guide 18 and which is secured to the latter or the hood 13, enables the user of the device to secure the arcuate element 19 in any adjusted position relatively to the hood 13.

At its lower end the member 19 carries a support 22 within which is rotatably secured a shaft 23 having at its inner end a socket 24, which socket is provided with a recess 25 through one wall thereof. Secured at opposite poles, which in the present instance would be the north and south poles of the sphere 16, are respective spindles 26 adapted to be received in the socket 24, each of these spindles having a key 27 formed thereon to enter the recess or keyway 25, so that the sphere 16 will not only be supported by the shaft 23, but will be non-rotatably connected to this shaft.

The spindles 26 may be secured to the sphere 16 in any desired manner, and two of such spindles are provided in order that the sphere may be reversed in position, and one or the other spindle 26 be secured to the shaft 23 depending upon whether the observer wishes to see the stars in the northern or southern hemispheres, that is to say, whether the observer wishes to see the heavens as they would appear to one north or south of the equator. It will be apparent that the sphere may readily be removed from the hood 13, and this reversal effected merely by sliding the element 19 completely out of the guide 18 upon loosening the set screw 20.

Figure 4:
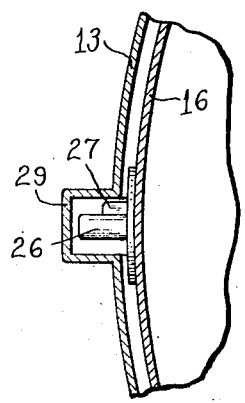
Fig. 4 is a detail sectional view on line 4—4 of Fig. 1.

As shown in Fig. 4 of the drawings, the hood 13 may be provided with an arcuate projecting portion 29 on the side thereof opposite the guideway 18, which projection is hollow so that it may receive the spindle 26 which is not associated with the socket 24, although it will be understood that the sphere will be supported wholly by its engagement in the shaft 23, this enlargement 29 on the surface of the hood merely housing one of the spindles during its movement so as to permit the surfaces of the sphere and hemisphere to lie closely together.

The shaft 23 may be secured against removal from the supporting member 22 by means of an annular recess 31 and a pin 32 passing through this recess, which arrangement will obviously permit free rotation of the shaft. The latter at its outer end is provided with a knob 33 by which it may be rotated, and with an enlarged head portion 34 which is disposed adjacent the larger end of the support 22. One of these members, in this case the head 34, is provided with indicia 35 representing the months or weeks of the year, while on the adjacent portion of the support 22 is provided indicia 36 representing the hour of the day, while the arcuate member 19 is provided with indicia 37 representing degrees of latitude at which the observer is located.

From the foregoing it will be apparent that, by turning the knob 33, the sphere 16 may be rotated upon its axis, the rotation turning the sphere with respect to the hemisphere about the axis of the shaft 23, so that that part of the sphere within the hood 13 may be made to correctly represent the heavens as they would appear at any time of day or year. It may be noted that this axis upon which the sphere 16 turns is at all times fixed with relation to the sphere, although it may be varied with respect to the hood 13 by sliding adjustment of the arcuate element 19 in the guide 18. This latter adjustment, which regulates the celestial sphere according to the latitude of the observer, also rotates the sphere 16 with respect to the hood 13, but rotates it about an axis which is fixed with respect to the hood, and which is at all times transverse to the axis of the shaft 23.

In order that the sphere may be turned to the proper position so that it may be oriented with respect to the points of the compass, I provide in the base 10 of the stand, as illustrated, a compass 38, so that the hood 13, together with the sphere secured thereto, may be rotated until the north and south of the instrument may be aligned with that of the actual celestial sphere.

It will be apparent that the key 27 fixes the position of the sphere 16 relatively to the rotating shaft 23, so that it is only necessary to place this key at the position in which, when the spindle is received into the socket of the shaft 23, the constellations or other heavenly bodies or markings on the sphere will be in their proper positions relatively to a predetermined point on the month dial which bears the month markings 35. Thus the sphere will always be placed in the proper position regardless of which spindle is employed in the socket 24. No further adjustments will be necessary in this respect.

In order to use the instrument, it is, therefore, only necessary for the observer to place the proper pole in the socket 24, depending upon whether he wishes to view the heavens of the northern or southern half of the celestial sphere. He then, by loosening the screw 20, adjusts the arcuate element 19 in the guideway 18 to the particular latitude at which the observation is desired. This element is graduated in degrees of latitude from zero to ninety. He next rotates the knob 23 so as to bring the particular hour at which the observation is to be made opposite the day of the month. Then, by looking through the uncovered or exposed part of the sphere 16, he will observe that half of the sphere which is covered by the hood 13, which will be an accurate representation of the heavens at the latitude and at the hour and day of the month designated by the setting of the instrument. As has been indicated, the hood 13 does not necessarily need to be opaque, but may be translucent. Preferably, however, it is darkened so as not to be wholly transparent, so that the indicia, such as constellations or other markings upon the exposed part of the sphere, will not be perceived. By swinging the hood 13 and the attached sphere 16 about the ball and socket joint 14, the instrument may be moved to any angle desired by the observer to afford greater vision of the part of the sky to be observed, thus affording greater convenience in looking through the exposed portion of the transparent sphere. It will be understood that the month dial will be divided into twelve equal parts, representing the twelve months of the year, about the member 34, and intermediate markings for days or fractions of a month may be inserted if desired. Likewise the hour dial will be conveniently divided into twenty-four parts around its circumference to correspond with the twenty-four hours of the day, and these markings will preferably represent local mean time.

The device will be found of great use in the study of astronomy, particularly in view of the great advantage it presents over flat maps, and the fact that it can be readily adjusted to any hour of the day, or to any day of the month and month of the year. The instrument will afford an accurate reproduction of the sky such as would be seen by an observer on a cloudless night, with the lower rim of the hood 13 outlining the horizon at the particular latitude for which the instrument is set.

The device may also be useful to navigators to enable them to locate the positions of the stars which they wish to use in making observations, and also may be used in a variety of other situations.

While I have shown and described a preferred embodiment of my invention, it will be understood that it is not to be limited to all the details shown, but is capable of modification and variation within the spirit of the invention and the scope of the claims.

What I claim is:

1. An educational appliance comprising a transparent sphere, a hollow non-transparent substantially hemispherical hood embracing and closely fitting the upper portion of said sphere, means for supporting said hood and attaching the sphere thereto, means for rotating said sphere relatively to the hood about two axes one of which is transverse with respect to the other, and elements on said sphere to denote the heavenly bodies, the inner and outer surfaces of said elements being of contrasting colors and the color of the outer surface being substantially the same as that of the interior of the hood.

2. An educational appliance comprising a transparent sphere, a hollow non-transparent substantially hemispherical hood embracing the upper portion of said sphere, means for supporting said hood and attaching the sphere thereto, means for rotating said sphere relatively to the hood, elements on said sphere to denote the heavenly bodies, the inner and outer surfaces of said elements being of contrasting colors, and the color of the outer surface being substantially the same as that of the interior of said hood.

3. An educational appliance comprising a transparent sphere, a hollow non-transparent substantially hemispherical hood embracing the upper portion of said sphere, means for supporting said hood and attaching the sphere thereto, means for rotating said sphere relatively to the hood, elements on said sphere to denote the heavenly bodies, and the inner and outer surfaces of said elements being of contrasting colors, the inner surface of said hood being of a dark color, the outer surfaces of said elements being of a dark color substantially like that of the hood and the inner surfaces thereof being of a light color whereby only those elements within the hood will be apparent to an observer looking through the sphere into the hood.

4. An educational appliance comprising a hollow substantially hemispherical body, said body being at least semi-opaque, means for suspending said body, a transparent spherical body substantially half of which is disposed within and closely embraced by said first-named body, means for detachably securing said members together in either of two relatively reversed positions whereby either half of the sphere may be embraced by the hemispherical body, and elements on said spherical body to denote the heavenly bodies, the inner and outer surfaces of said elements being of contrasting colors and the color of the outer surface being substantially the same as that of the interior of said hemispherical body.

5. An educational appliance comprising a hollow substantially hemispherical body, said body being at least semi-opaque, means for suspending said body, a transparent spherical body substantially half of which is disposed within said first-named body, means for detachably securing said members together comprising an arcuate member secured to one of said bodies, and a guide element on the other slidably engaged with said member, said guide element extending along a meridian of said hemispherical body.

6. An educational appliance comprising a hollow substantially hemispherical body, said body being at least semi-opaque, means for suspending said body, a transparent spherical body substantially half of which is disposed within said first-named body, means for detachably securing said members together comprising an arcuate member secured to one of said bodies and an element on the other slidably engaged with said member, and means for rotating said sphere about an axis on said arcuate member.

7. An educational appliance comprising a hollow substantially hemispherical body, said body being at least semi-opaque, means for suspending said body, a transparent spherical body substantially half of which is disposed within said first-named body, means for detachably securing said members together comprising an arcuate member attached to the sphere, and a guide on said hemispherical body with which said member is slidably engaged, said guide constraining said member to movement along a meridian of said hemispherical body, and said sphere being rotatably connected to said arcuate member on an axis passing through the center of the sphere.

8. An educational appliance comprising a hollow substantially hemispherical body, said body being at least semi-opaque, means for suspending said body, a transparent spherical body substantially half of which is disposed within said first-named body, means for detachably securing said members together comprising an arcuate member slidably secured to said hemispherical body, and means rotatably securing the spherical body to said member whereby the sphere may be rotated relatively to the hemisphere about either of two transverse axes.

9. A device of the character described, comprising a substantially opaque hollow hemispherical hood, means for supporting said hood, a transparent sphere supported by said hood with the latter embracing substantially half of the sphere, means for rotating said sphere about an axis fixed with respect to the sphere but movable with respect to the hood, and elements on said sphere to denote the heavenly bodies, the inner and outer surfaces of said elements being of contrasting colors and the color of the outer surface being substantially the same as that of the interior of the hood.

10. A device of the character described, comprising a substantially opaque hollow hemispherical hood, means for supporting said hood, a transparent sphere supported by said hood with the latter embracing substantially half of the sphere, means for rotating said sphere about an axis fixed with respect to the sphere but movable with respect to the hood, means for rotating the sphere about another axis fixed with respect to the hood, said last-named axis being a diameter of said hood, and elements on said sphere to denote the heavenly bodies, the inner and outer surfaces of said elements being of contrasting colors and the color of the outer surface being substantially the same as that of the interior of the hood.

11. A device of the class described, comprising a support, a substantially hemispherical nontransparent hood carried thereby, a member of arcuate shape slidably attached to said hood to move along a meridian thereof, a shaft rotatably carried by said member adjacent one end thereof, a transparent sphere supported by the shaft and having its upper portion embraced within said hood, indicia on said sphere, a member fixed upon said shaft and having scale markings thereon, and a cooperating member also having scale markings thereon, one of said markings indicating hours of the day and the other periods of the year.

12. A device of the class described, comprising a support, a substantially hemispherical nontransparent hood carried thereby, a member of arcuate shape slidably attached to said hood to move along a meridian thereof, a shaft rotatably carried by said member adjacent one end thereof, a transparent sphere supported by the shaft and having its upper portion embraced within said hood, a member fixed upon said shaft and having scale markings thereon, and a cooperating, relatively stationary member also having scale markings thereon, one of said markings indicating hours of the day and the other months of the year, said shaft having a socket therein, said sphere having spindles at opposite poles thereof to be received in said socket, and elements on said sphere denoting the heavenly bodies and having their inner and outer surfaces of contrasting colors, and their outer surfaces being of substantially the same color as the interior of the hood.

13. A device of the class described, comprising a support, a substantially hemispherical nontransparent hood carried thereby, a member of arcuate shape slidably attached to said hood to move along a meridian thereof, a shaft rotatably carried by said member adjacent one end thereof, a transparent sphere supported by the shaft and having its upper portion embraced within said hood, a member fixed upon said shaft and having scale markings thereon, a cooperating, relatively stationary member also having scale markings thereon, one of said markings indicating hours of the day and the other months of the year, said shaft having a socket therein, said sphere having spindles at opposite poles thereof to be received in said socket, and said arcuate member having latitude indications thereon, and elements on said sphere denoting the heavenly bodies and having their inner and outer surfaces of contrasting colors, and their outer surfaces being of substantially the same color as the interior of the hood.

EDWARD E. OBERST.